(12) United States Patent
Cohen et al.

(10) Patent No.: US 11,574,559 B2
(45) Date of Patent: Feb. 7, 2023

(54) REFRESHABLE TACTILE DISPLAY

(71) Applicant: BEACON STREET INNOVATIONS, LLC, Bexley, OH (US)

(72) Inventors: Douglas Jay Cohen, Bexley, OH (US); Thor Leif Hendrickson, London (GB)

(73) Assignee: BEACON STREET INNOVATIONS, LLC, Bexley, OH (US)

( * ) Notice: Subject to any disclaimer, the term of this patent is extended or adjusted under 35 U.S.C. 154(b) by 0 days.

(21) Appl. No.: 17/399,767

(22) Filed: Aug. 11, 2021

(65) Prior Publication Data

US 2022/0051590 A1 Feb. 17, 2022

Related U.S. Application Data

(60) Provisional application No. 63/064,543, filed on Aug. 12, 2020.

(51) Int. Cl.
*G09B 21/00* (2006.01)
*G06F 3/02* (2006.01)
*G06F 3/01* (2006.01)

(52) U.S. Cl.
CPC ........... *G09B 21/004* (2013.01); *G06F 3/016* (2013.01); *G06F 3/0205* (2013.01)

(58) Field of Classification Search
CPC .............................. G09B 21/004; G06F 3/016
See application file for complete search history.

(56) References Cited

U.S. PATENT DOCUMENTS

| 6,827,512 | B1* | 12/2004 | Souluer | G09B 21/025 |
| | | | | 434/114 |
| 8,602,786 | B2* | 12/2013 | Takahashi | G09B 21/004 |
| | | | | 434/112 |
| 2019/0385483 | A1 | 12/2019 | Cohen et al. | |
| 2021/0077337 | A1* | 3/2021 | Kim | A61H 3/061 |

FOREIGN PATENT DOCUMENTS

| JP | 2802257 B2 | 9/1998 |
| WO | 2019225977 A1 | 11/2019 |

OTHER PUBLICATIONS

Search Report and Written Opinion for International Patent Application No. PCT/US2021/071161; dated Dec. 9, 2021.

* cited by examiner

*Primary Examiner* — Nelson M Rosario
*Assistant Examiner* — Scott D Au
(74) *Attorney, Agent, or Firm* — Barnes & Thornburg LLP; Jason Bernstein (57) ABSTRACT

A tactile display for dynamically reproducing content from an electronic device, such as a computer, tablet, mobile phone or other device, in a touch-sensory format, such as Braille. The tactile display includes a housing and a plurality of tactile elements. The tactile elements are movable relative to the housing between an extended position for engagement by a user and a retracted position at or inward of a surface of the housing.

20 Claims, 8 Drawing Sheets

REFRESHABLE TACTILE DISPLAY

CROSS-REFERENCE TO RELATED APPLICATION

This application claims priority under 35 U.S.C. § 119(e) to U.S. Provisional Application No. 63/064,543, filed Aug. 12, 2020, which is expressly incorporated by reference herein.

FIELD

The present disclosure relates, in exemplary embodiments, to a tactile display for dynamically reproducing content from an electronic device, such as a computer, tablet, mobile phone or other device, in a touch-sensory format, such as Braille.

BACKGROUND

Braille is a language of raised dots read by the fingertips. Louis Braille, a young blind teacher in Paris, created the system in the 1800s whereby alphanumeric characters could be displayed with the sense of touch. The raised dots are created by indentations in paper. Each character is displayed with dots orientated in two vertical columns of three dots each. A sight impaired person then reads by passing fingertips from left to right across a row of characters. Characters can be arranged on a page such that a page of Braille text aligns in a similar fashion to a line of written text that would be displayed to a sighted person.

Braille is displayed in a few different forms currently. Grade I Braille is the current format that is translated letter for letter. Capital letters and other symbols require two characters to be displayed. Grade II Braille is a format that contracts many combinations of letters, such as "tt", and "ough." This allows the reader to have to sense less characters to read, so that faster reading can be attained. Additionally, current format computer braille is often displayed with eight dot Braille, where each character consists of two columns of four dots. This allows for items such as capital letters to be displayed as a single character, instead of two as would be displayed in Grade I Braille.

The Braille dots and how they raise and lower mechanically to create a touchable surface are a critical element of the display. The dots are actuated by placing an actuator under the dot, and with some type of physical force, the dot is raised ("up" position) and or lowered ("down" position).

The current designs of refreshable Braille displays on the market today make use of piezoelectric actuators to raise and lower the braille dots. Each dot of a Braille character requires its own actuator, so an eight dot character of Braille requires eight of these actuators. Piezoelectric actuators work by applying an electric current across a material strip (usually made from ceramic and or metal materials), which then causes the strip to deflect. This deflection causes the dot to raise. However, these piezo actuators are very expensive to manufacture. Therefore, the cost per Braille cell is too high to be used in mass quantity, such as a display containing multiple lines of Braille. Additionally, and more importantly, the piezo electric design does not allow the actuator of each dot to physically reside under each dot. This piezoelectric actuator must be sufficiently long to cause the dot to raise enough for Braille. This length is much longer than what can physically reside under a dot, and therefore limits the current refreshable Braille displays to a single line of text for most applications. Multi-line units are not only too expensive to build, but physically will not allow actuators to fit within the required confines of multi-line displays. This limit to single line displays then forces Braille readers to read one line of text at a time, akin to reading a book on a ticker tape display. This method slows Braille reading down significantly, and results in less access to many methods of print media for the sight impaired.

Therefore, there is a need for compact actuation of tactile elements in a display.

SUMMARY

A tactile display in accordance with an embodiment of the present disclosure may include a housing and a pixel unit coupled to the housing. The housing may define an outward-facing surface. The pixel unit may comprise a tactile element, a latch, and an actuator. The tactile element may be arranged for movement between an extended position where a portion of the tactile element extends outward from the outward-facing surface and a retracted position where the tactile element is arranged at or inward of the outward-facing surface. The latch may be pivotably coupled to the housing. The actuator may be coupled to the housing and configured to generate a magnetic field to induce rotation of a magnetic element coupled to the latch for driving rotation of the latch between a locked position corresponding to the extended position of the tactile element and an unlocked position corresponding to the retracted position of the tactile element. The latch may be configured to force the tactile element to move from the retracted position to the extended position with rotation of the latch from the unlocked position to the locked position. The latch may block movement of the tactile element from the extended position toward the retracted position with the latch in the locked position.

In illustrative embodiments, an arm of the tactile element may be pivotably coupled to the housing and terminate in an engagement portion. The engagement portion may extend outward from the outward-facing surface in the extended position of the tactile element and be arranged at or inward of the outward-facing surface in the retracted position of the tactile element.

In illustrative embodiments, the latch may include a body portion pivotably coupled to the housing and a cam portion extending from the body portion. The cam portion may be arranged to engage with the arm portion of the tactile element with rotation of the latch from the unlocked position toward the locked position to drive movement of the tactile element from the retracted position toward the extended position.

In illustrative embodiments, the cam portion of the latch may engage with the arm portion of the tactile element in the locked position to block movement of the tactile element from the extended position toward the retracted position.

In illustrative embodiments, an arm of the tactile element may be pivotably coupled to the latch and terminate in an engagement portion. The engagement portion may extend outward from the outward-facing surface in the extended position of the tactile element and be arranged at or inward of the outward-facing surface in the retracted position of the tactile element. The arm of the tactile element may engage with the latch during rotation of the latch from the unlocked position to the locked position to drive movement of the tactile element from the retracted position toward the extended position.

In illustrative embodiments, a link may be pivotably coupled to the tactile element and pivotably coupled to the latch. The link may engage with the tactile element and the latch during rotation of the latch from the unlocked position to the locked position to drive movement of the tactile element from the retracted position toward the extended position.

In illustrative embodiments, the tactile display may further comprise a magnetic element coupled to the tactile element. The magnetic element coupled to the tactile element may be magnetically attracted toward the magnetic element coupled to the latch.

In illustrative embodiments, the latch may engage with the housing and/or the actuator in the locked position to limit rotation of the latch.

A tactile display in accordance with another embodiment of the present disclosure may include a housing and a plurality of pixel units coupled to the housing. The housing may define an outward-facing surface, and the plurality of pixel units may be arranged in at least one row and/or at least one column along the outward-facing surface. Each pixel unit may comprise a tactile element, a latch, and an actuator. The tactile element may be arranged for movement between an extended position where a portion of the tactile element extends outward from the outward-facing surface and a retracted position where the tactile element is arranged at or inward of the outward-facing surface. The latch may be pivotably coupled to the housing. The actuator may be coupled to the housing and configured to generate a magnetic field to induce rotation of a magnetic element coupled to the latch for driving rotation of the latch between a locked position corresponding to the extended position of the tactile element and an unlocked position corresponding to the retracted position of the tactile element. The latch may be configured to force the tactile element to move from the retracted position to the extended position with rotation of the latch from the unlocked position to the locked position. The latch may block movement of the tactile element from the extended position toward the retracted position with the latch in the locked position.

A pixel unit in accordance with another embodiment of the present disclosure may include a tactile element, a latch, and an actuator. The tactile element may be arranged for movement between an extended position and a retracted position. The latch may be pivotably coupled to the housing. The actuator may be coupled to the housing and configured to generate a magnetic field to induce rotation of a magnetic element coupled to the latch for driving rotation of the latch between a locked position corresponding to the extended position of the tactile element and an unlocked position corresponding to the retracted position of the tactile element. The latch may be configured to force the tactile element to move from the retracted position to the extended position with rotation of the latch from the unlocked position to the locked position. The latch may block movement of the tactile element from the extended position toward the retracted position with the latch in the locked position.

Other features will become apparent upon reading the following detailed description of certain exemplary embodiments, when taken in conjunction with the appended claims.

BRIEF DESCRIPTION OF THE DRAWINGS

The detailed description particularly refers to the accompanying figures in which.

In describing the exemplary embodiments of the present disclosure, which is illustrated in the drawings, specific terminology will be resorted to for the sake of clarity. However, it is not intended that the present disclosure be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

Unless otherwise indicated, the drawings are intended to be read (for example, cross-hatching, arrangement of parts, proportion, degree, or the like) together with the specification, and are to be considered a portion of the entire written description. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
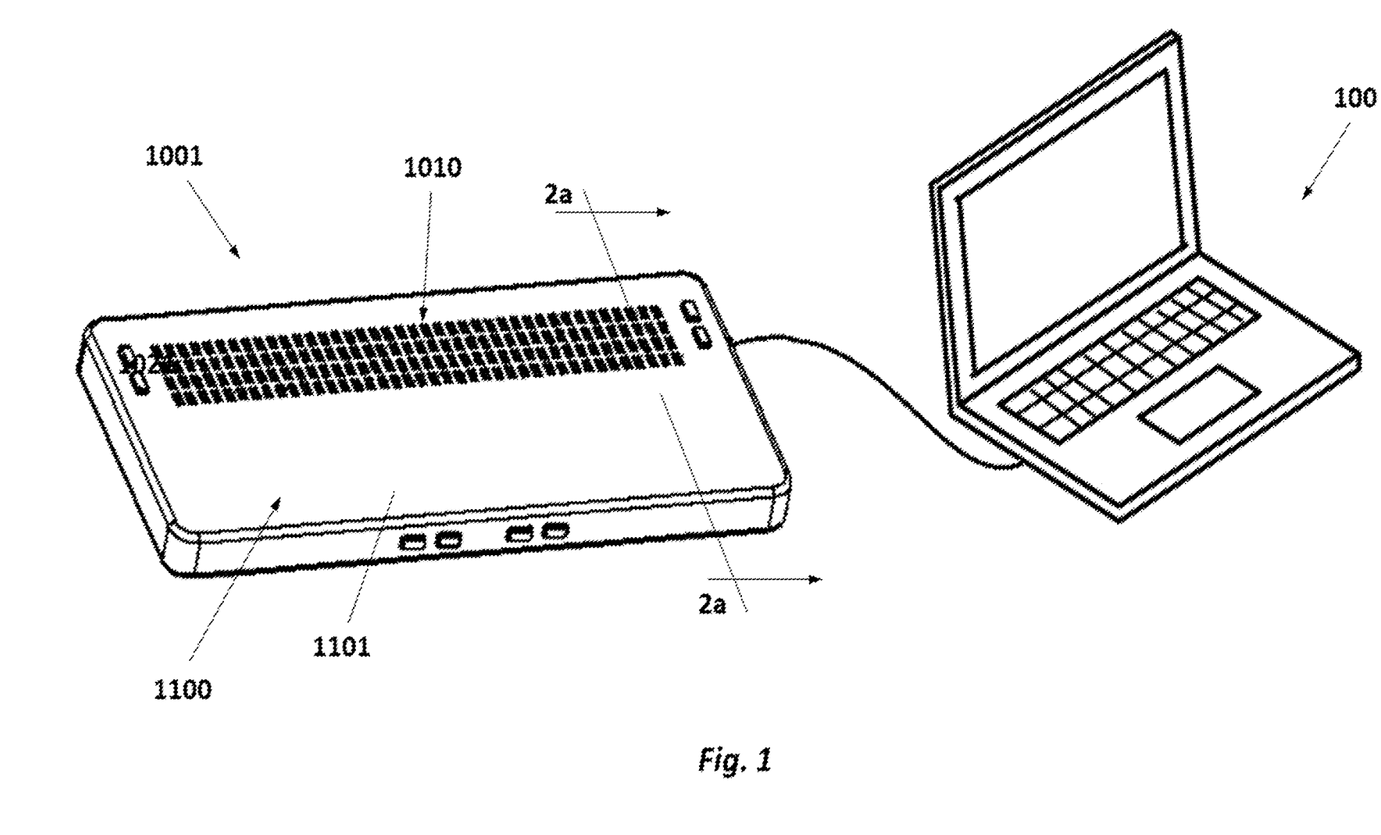
FIG. 1 is a perspective view of an embodiment of a tactile display in accordance with the present disclosure.
Figure 2A:
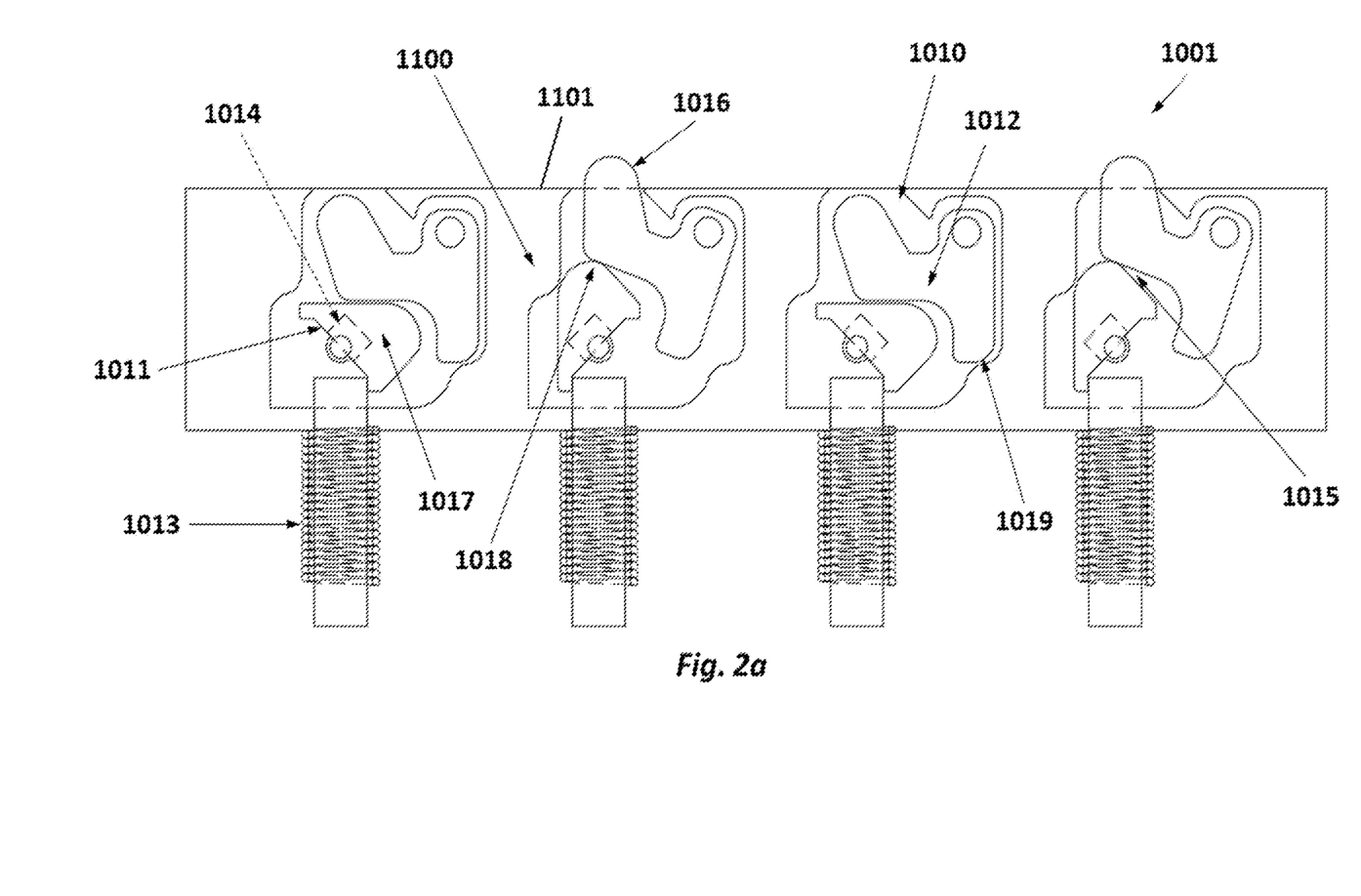
FIG. 2a is a sectional view taken along line 2a-2a in FIG. 1.

An illustrative tactile display 1001 in accordance with an embodiment of the present disclosure is shown in FIG. 1. The tactile display 1001 includes a housing 1100 and one or more pixel units 1010 coupled to the housing 1100. The housing 1100 defines an outward-facing surface 1101 and the pixel units 1010 are arranged on the housing 1100 inward of the surface 1101 as shown in FIG. 2a. The tactile display 1001 dynamically reproduces content from an electronic device 100 (FIG. 1), such as a computer, tablet, mobile phone or other device, in a touch-sensory format, such as Braille. The pixel units 1010 are configured to provide dynamic, touch-sensory feedback to a user running their fingertip along the surface 1101. In some embodiments, the tactile display 1001 includes a plurality of pixel units 1010 arranged in rows and columns along the surface 1101. In some embodiments, a plurality of pixel units 1010 are arranged relative to one another in a pattern, such as a Braille cell.

Each exemplary pixel unit 1010 includes a tactile element 1012, a latch 1011, and an actuator 1013 as shown in FIG. 2a. An arm 1015 of the tactile element 1012 is pivotably coupled to the housing 1100 and terminates in an engagement portion 1016. The tactile element 1012 is movable relative to the housing 1100 between an extended position with the engagement portion 1016 extending outward from the surface 1101 and a retracted position with the engagement portion 1016 arranged at or inward from the surface 1101. In some embodiments, a leg 1019 of the tactile element 1012 engages the housing 1100 to limit pivoting movement of the tactile element 1012 relative to the housing 1100.

The latch 1011 is pivotably coupled to the housing 1100 and defines a base portion 1017 and a cam portion 1018 extending from the base portion 1017 as shown in FIG. 2a. The latch 1011 is movable between an unlocked position and a locked position. The arm 1015 of the tactile element 1012 engages with the base portion 1017 of the latch 1011 with the latch 1011 in the unlocked position and the tactile element 1012 in the retracted position. The arm 1015 of the tactile element 1012 engages with the cam portion 1018 of the latch 1011 with the latch 1011 in the locked position and the tactile element 1012 in the extended position. In some embodiments, the latch 1011 engages with the housing 1100 and/or actuator 1013 in the locked position to block rotation of the latch 1011 and hold the tactile element 1012 in the extended position against forces exerted on the engagement portion 1016 of the arm 1015, such as during contact of the engagement portion 1016 by a user. In some embodiments, a detent or other structure engages with the latch 1011 in the locked position to block rotation of the latch 1011. In some embodiments, the leg 1019 of the tactile element 1012 engages the latch 1011 with the latch 1011 in the unlocked position to limit pivoting movement of the tactile element 1012 relative to the housing 1100. In some illustrative embodiments the latch 1011 engages a leg 1019 with rotation of the latch 1011 to the unlocked position to force the tactile element 1012 toward the retracted position.

In the illustrative embodiment, a magnetic element 1014 is coupled to the latch 1011 and the actuator 1013 is configured to generate a magnetic field to induce rotation of the magnetic element 1014 and attached latch 1011 as shown in FIG. 2a. The latch 1011 is configured to force the tactile element 1012 to move from the retracted position to the extended position with rotation of the latch 1011 from the unlocked position to the locked position. In some embodiments, the cam portion 1018 of the latch 1011 rides along the arm 1015 of the tactile element 1012 with rotation of the latch 1011 from the unlocked position to the locked position to drive rotation of the tactile element 1012 from the retracted position toward the extended position. In some embodiments, the actuator 1013 is formed from a coil wrapped around a metal core, and the coil is selectively energized by a power source. In some embodiments, the actuator 1013 can generate multiple magnetic fields, such as a positive field and a negative field, for driving rotation of the latch 1011 between the unlocked and locked positions. In some embodiments, the latch 1011 and/or tactile element 1012 are biased relative to the housing 1100 and the actuator 1013 is configured to overcome the bias when driving rotation of the latch 1011. In some embodiments, the magnetic element 1014 is a magnet or a magnetically-attractive material, such as metal. In some embodiments, the actuator 1013 is aligned with a pivot point of the latch 1011, and a pivot point of the tactile element 1012 is laterally offset from the latch 1011 and the actuator 1013.

Figure 2B:
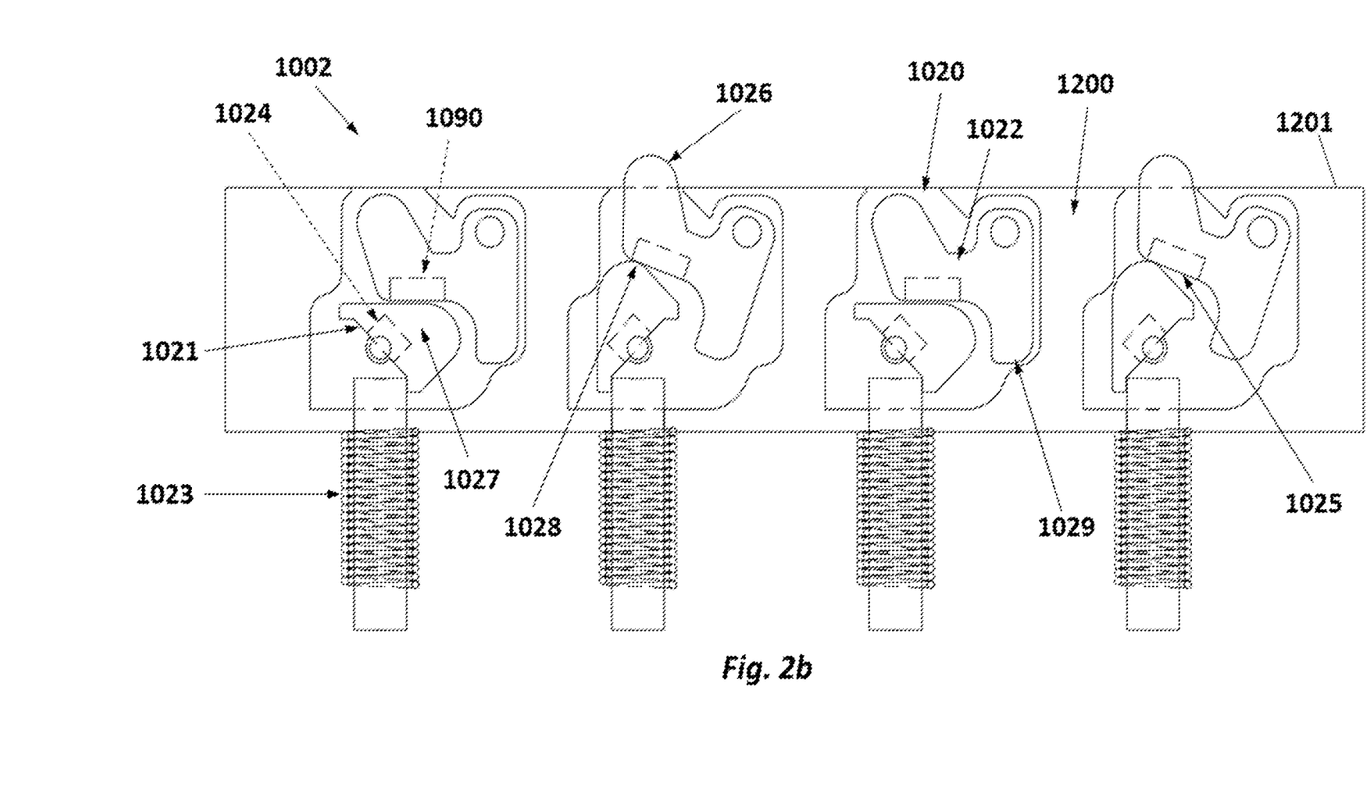
FIG. 2b is a sectional view of another embodiment of a tactile display in accordance with the present disclosure.

An illustrative tactile display 1002 in accordance with another embodiment of the present disclosure is shown in FIG. 2b. The tactile display 1002 is similar to the tactile display 1001 of FIG. 2a with similar numbers in the 1020's and 1200's used to identify similar components. At least one difference between the tactile display 1002 and the tactile display 1001 is that a magnetic element 1090 is coupled to the tactile element 1022 as shown in FIG. 2b. In some embodiments, the actuator 1023 is configured to generate a magnetic field to induce rotation of the magnetic element 1024 and attached latch 1021 for movement of the tactile element 1022 between the extended and retracted positions. In some embodiments, the actuator 1023 is configured to generate a magnetic field to repulse or attract the magnetic element 1090 for movement of the tactile element 1022 between the extended and retracted positions. In some embodiments, the magnetic element 1090 is magnetically biased toward the magnetic element 1014. In some embodiments, the magnetic element 1090 is a magnet or a magnetically-attractive material, such as metal.

Figure 2C:
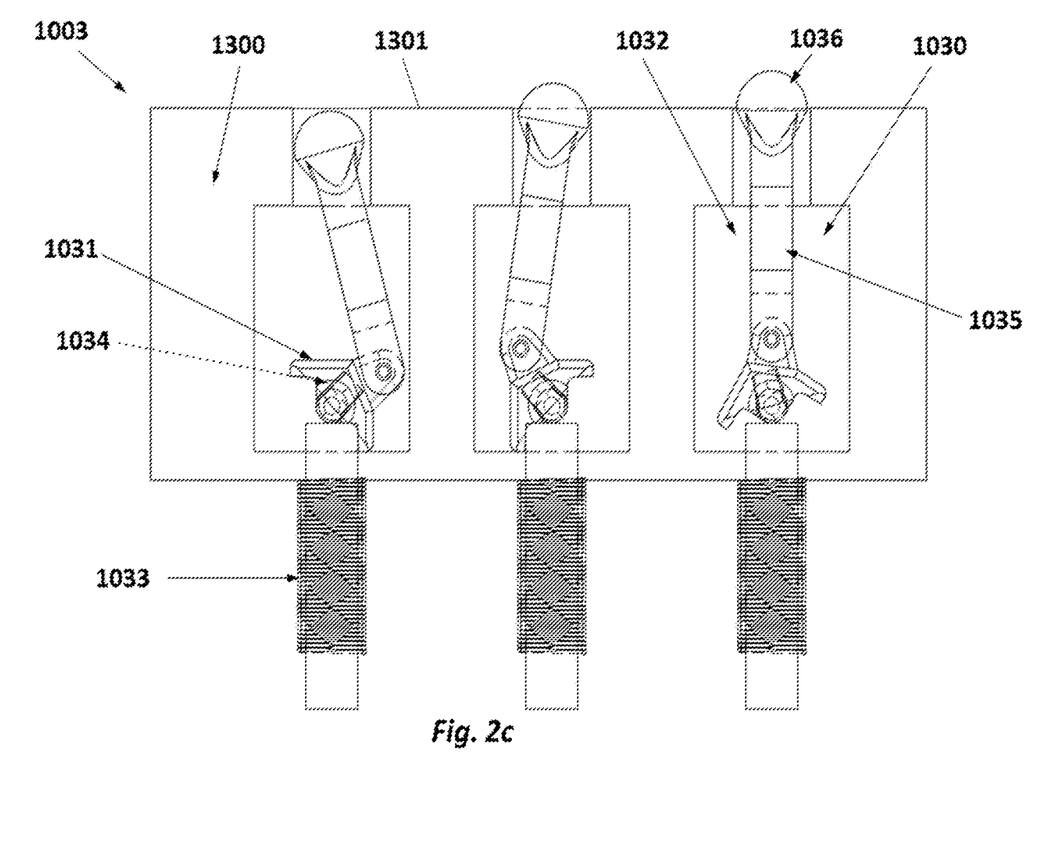
FIG. 2c is a sectional view of another embodiment of a tactile display in accordance with the present disclosure.

An illustrative tactile display 1003 in accordance with another embodiment of the present disclosure is shown in FIG. 2c. The tactile display 1003 includes a housing 1300 and one or more pixel units 1030 coupled to the housing 1300. The housing 1300 defines an outward-facing surface 1301 and the pixel units 1030 are arranged on the housing 1300 inward of the surface 1301. The tactile display 1003 dynamically reproduces content from an electronic device, such as the electronic device 100 of FIG. 1, in a touch-sensory format, such as Braille. The pixel units 1030 are configured to provide dynamic, touch-sensory feedback to a user running their fingertip along the surface 1301. In some embodiments, the tactile display 1003 includes a plurality of pixel units 1030 arranged in rows and columns along the surface 1301. In some embodiments, a plurality of pixel units 1030 are arranged relative to one another in a pattern, such as a Braille cell.

Each exemplary pixel unit 1030 includes a tactile element 1032, a latch 1031, and an actuator 1033 as shown in FIG. 2c. An arm 1035 of the tactile element 1032 is pivotably coupled to the latch 1031 and terminates in an engagement portion 1036. The tactile element 1032 is movable relative to the housing 1300 between an extended position with the engagement portion 1036 extending outward from the surface 1301 and a retracted position with the engagement portion 1036 arranged at or inward from the surface 1301. In some embodiments, the engagement portion 1036 moves along a substantially linear path between the extended and retracted positions.

The latch 1031 is pivotably coupled to the housing 1300 as shown in FIG. 2c. The latch 1031 is movable between an unlocked position corresponding to the retracted position of the tactile element 1032 and a locked position corresponding to the extended position of the tactile element 1032. In some embodiments, the latch 1031 engages with the housing 1300 and/or actuator 1033 in the locked position to block rotation of the latch 1031 and hold the tactile element 1032 in the extended position against forces exerted on the engagement portion 1036 of the arm 1035, such as during contact of the engagement portion 1036 by a user. In some embodiments, a detent or other structure engages with the latch 1031 in the locked position to block rotation of the latch 1031.

In the illustrative embodiment, a magnetic element 1034 is coupled to the latch 1031 and the actuator 1033 is configured to generate a magnetic field to induce rotation of the magnetic element 1034 and attached latch 1031 as shown in FIG. 2c. The latch 1031 is configured to force the tactile element 1032 to move from the retracted position to the extended position with rotation of the latch 1031 from the unlocked position to the locked position. In some embodiments, the arm 1035 of the tactile element 1032 engages with the latch 1031 during rotation of the latch 1031 from the unlocked position to the locked position to drive movement of the tactile element 1032 from the retracted position toward the extended position. In some embodiments, the actuator 1033 is formed from a coil wrapped around a metal core, and the coil is selectively energized by a power source. In some embodiments, the actuator 1033 can generate multiple magnetic fields, such as a positive field and a negative field, for driving rotation of the latch 1031 between the unlocked and locked positions. In some embodiments, the latch 1031 and/or tactile element 1032 are biased relative to the housing 1300 and the actuator 1033 is configured to overcome the bias when driving rotation of the latch 1031. In some embodiments, the magnetic element 1034 is a magnet or a magnetically-attractive material, such as metal.

Figure 2D:
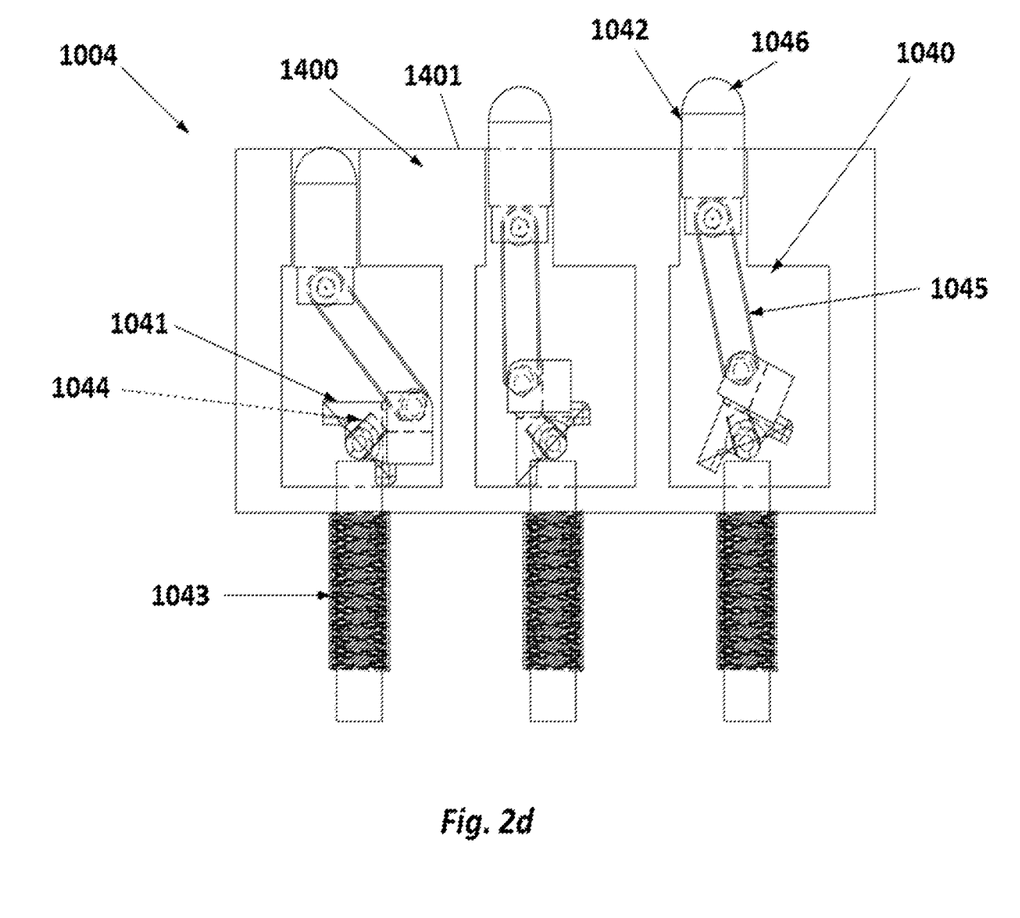
FIG. 2d is a sectional view of another embodiment of a tactile display in accordance with the present disclosure.

An illustrative tactile display 1004 in accordance with another embodiment of the present disclosure is shown in FIG. 2d. The tactile display 1004 includes a housing 1400 and one or more pixel units 1040 coupled to the housing 1400. The housing 1400 defines an outward-facing surface 1401 and the pixel units 1040 are arranged on the housing 1400 inward of the surface 1401. The tactile display 1004 dynamically reproduces content from an electronic device, such as the electronic device 100 of FIG. 1, in a touch-sensory format, such as Braille. The pixel units 1040 are configured to provide dynamic, touch-sensory feedback to a user running their fingertip along the surface 1401. In some embodiments, the tactile display 1004 includes a plurality of pixel units 1040 arranged in rows and columns along the surface 1401. In some embodiments, a plurality of pixel units 1040 are arranged relative to one another in a pattern, such as a Braille cell.

Each exemplary pixel unit 1040 includes a tactile element 1042, a latch 1041, a link 1045 coupled between the tactile element 1042 and the latch 1041, and an actuator 1043 as shown in FIG. 2d. One end of the link 1045 is pivotably coupled to the tactile element 1042 and an opposite end of the link 1045 is pivotably coupled to the latch 1041. The tactile element 1042 defines an engagement portion 1046, and the tactile element 1042 is movable relative to the housing 1400 between an extended position with the engagement portion 1046 extending outward from the surface 1401 and a retracted position with the engagement portion 1046 arranged at or inward from the surface 1401. In some embodiments, the engagement portion 1046 moves along a substantially linear path between the extended and retracted positions.

The latch 1041 is pivotably coupled to the housing 1400 as shown in FIG. 2d. The latch 1041 is movable between an unlocked position corresponding to the retracted position of the tactile element 1042 and a locked position corresponding to the extended position of the tactile element 1042. In some embodiments, the latch 1041 engages with the housing 1400 and/or actuator 1043 in the locked position to block rotation of the latch 1041 and hold the tactile element 1042 in the extended position against forces exerted on the engagement portion 1046, such as during contact of the engagement portion 1046 by a user. In some embodiments, a detent or other structure engages with the latch 1041 in the locked position to block rotation of the latch 1041. In some embodiments, the link 1045 engages with the latch 1041 in the locked position to block rotation of the latch 1041.

In the illustrative embodiment, a magnetic element 1044 is coupled to the latch 1041 and the actuator 1043 is configured to generate a magnetic field to induce rotation of the magnetic element 1044 and attached latch 1041 as shown in FIG. 2d. The latch 1041 is configured to force the tactile element 1042 to move from the retracted position to the extended position with rotation of the latch 1041 from the unlocked position to the locked position. In some embodiments, the link 1045 engages with the tactile element 1042 and the latch 1041 during rotation of the latch 1041 from the unlocked position to the locked position to drive movement of the tactile element 1042 from the retracted position toward the extended position. In some embodiments, the actuator 1043 is formed from a coil wrapped around a metal core, and the coil is selectively energized by a power source. In some embodiments, the actuator 1043 can generate multiple magnetic fields, such as a positive field and a negative field, for driving rotation of the latch 1041 between the unlocked and locked positions. In some embodiments, the latch 1041 and/or tactile element 1042 are biased relative to the housing 1400 and the actuator 1043 is configured to overcome the bias when driving rotation of the latch 1041. In some embodiments, the magnetic element 1044 is a magnet or a magnetically-attractive material, such as metal.

Figure 2E:
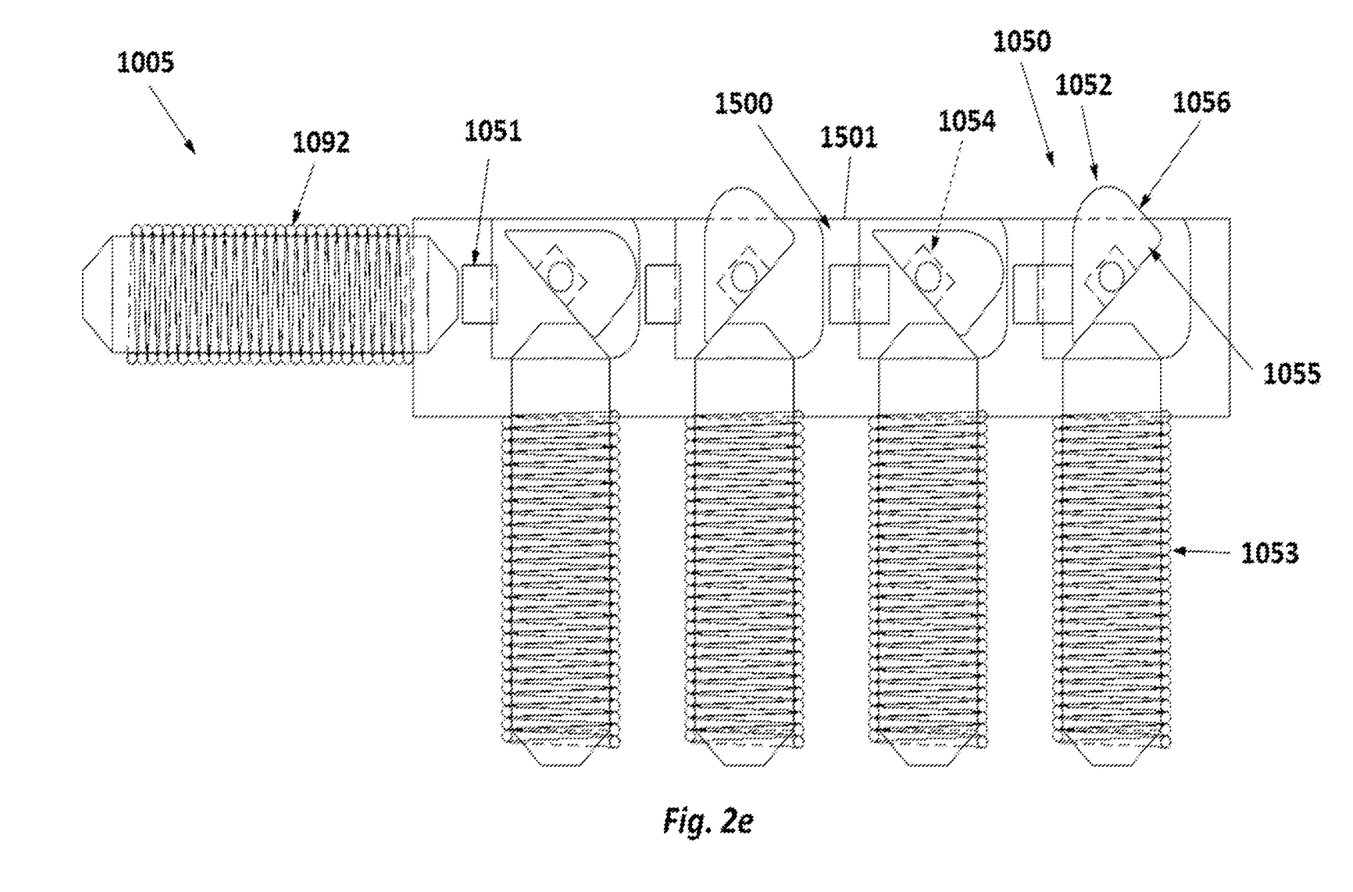
FIG. 2e is a sectional view of another embodiment of a tactile display in accordance with the present disclosure.

An illustrative tactile display 1005 in accordance with another embodiment of the present disclosure is shown in FIG. 2e. The tactile display 1005 includes a housing 1500 and one or more pixel units 1050 coupled to the housing 1500. The housing 1500 defines an outward-facing surface 1501 and the pixel units 1050 are arranged on the housing 1500 inward of the surface 1501. The tactile display 1005 dynamically reproduces content from an electronic device, such as the electronic device 100 of FIG. 1, in a touch-sensory format, such as Braille. The pixel units 1050 are configured to provide dynamic, touch-sensory feedback to a user running their fingertip along the surface 1501. In some embodiments, the tactile display 1005 includes a plurality of pixel units 1050 arranged in rows and columns along the surface 1501. In some embodiments, a plurality of pixel units 1050 are arranged relative to one another in a pattern, such as a Braille cell.

Each exemplary pixel unit 1050 includes a tactile element 1052 and an actuator 1053 as shown in FIG. 2e. The tactile element 1052 is pivotably coupled to the housing 1500 and includes a body portion 1055 and an engagement portion 1056 extending from the body portion 1055. The tactile element 1052 is movable relative to the housing 1500 between an extended position with the engagement portion 1056 extending outward from the surface 1501 and a retracted position with the engagement portion 1056 arranged at or inward from the surface 1501. In some embodiments, the body portion 1055 of the tactile element 1052 engages with the housing 1500 and/or actuator 1053 to limit pivoting movement of the tactile element 1052 relative to the housing 1500.

In the illustrative embodiment, a magnetic element 1054 is coupled to the tactile element 1052 and the actuator 1053 is configured to generate a magnetic field to induce rotation of the magnetic element 1054 and attached tactile element 1052 as shown in FIG. 2e. In some embodiments, the actuator 1053 is formed from a coil wrapped around a metal core, and the coil is selectively energized by a power source. In some embodiments, the actuator 1053 can generate multiple magnetic fields, such as a positive field and a negative field, for driving rotation of the tactile element 1052 between the extended and retracted positions. In some embodiments, the tactile element 1052 is biased relative to the housing 1500 and the actuator 1053 is configured to overcome the bias when driving rotation of the tactile element 1052. In some embodiments, the magnetic element 1054 is a magnet or a magnetically-attractive material, such as metal.

A plurality of pixel units 1050 are aligned with one another in the exemplary tactile display 1005 as shown in FIG. 2e. In the illustrative embodiment, stop members 1051 are coupled to the housing 1500 and arranged for movement relative to the tactile elements 1052 between a stay position and a release position. An actuator 1092 is coupled to the housing 1500 and configured to drive movement of the stop members 1051 between the stay and release positions. In some embodiments, the stop members 1051 are magnets or a magnetically-attractive material, such as metal, and the actuator 1092 is configured to generate magnetic fields to attract or repel the stop members 1051. In some embodiments, the stop members 1051 move simultaneously to the stay position or to the release position. In some embodiments, the stop members 1051 are coupled together by a link or other member, and the actuator 1092 is configured to drive movement of the link and/or one of the stop members 1051 to drive movement of the other aligned stop members 1051.

The stop members 1051 are arranged to engage with the tactile elements 1052 as suggested in FIG. 2e. With the tactile element 1052 in the extended position, the stop member 1051 engages with the body portion 1055 and the housing 1500 in the stay position to block rotation of the tactile element 1052 toward the retracted position. With the tactile element 1052 in the retracted position, the stop member 1051 engages with the body portion 1055 and the housing 1500 in the stay position to block rotation of the tactile element 1052 toward the extended position. The tactile element 1052 is allowed to rotate between the extended and retracted positions with the stop member 1051 in the release position.

Figure 2F:
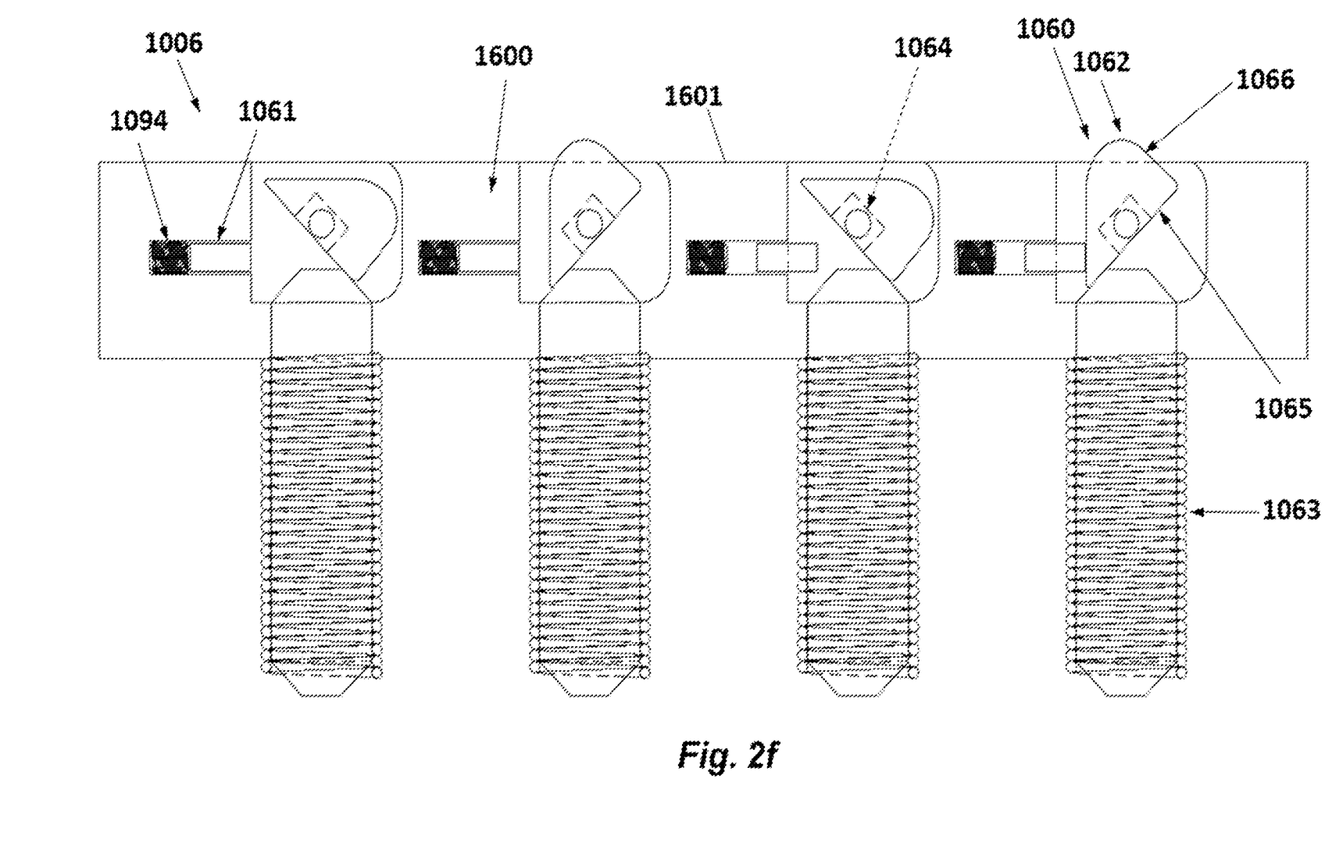
FIG. 2f is a sectional view of another embodiment of a tactile display in accordance with the present disclosure.

An illustrative tactile display 1006 in accordance with another embodiment of the present disclosure is shown in FIG. 2f. The tactile display 1006 is similar to the tactile display 1005 of FIG. 2e with similar numbers in the 1060's and 1600's used to identify similar components. At least one difference between the tactile display 1006 and the tactile display 1005 is that a plurality of actuators 1094 are arranged to drive movement of respective stop members 1061. In the illustrative embodiment, each actuator 1094 drives movement of a respective one of the stop members 1061 independent of the other stop members 1061.

Figure 2G:
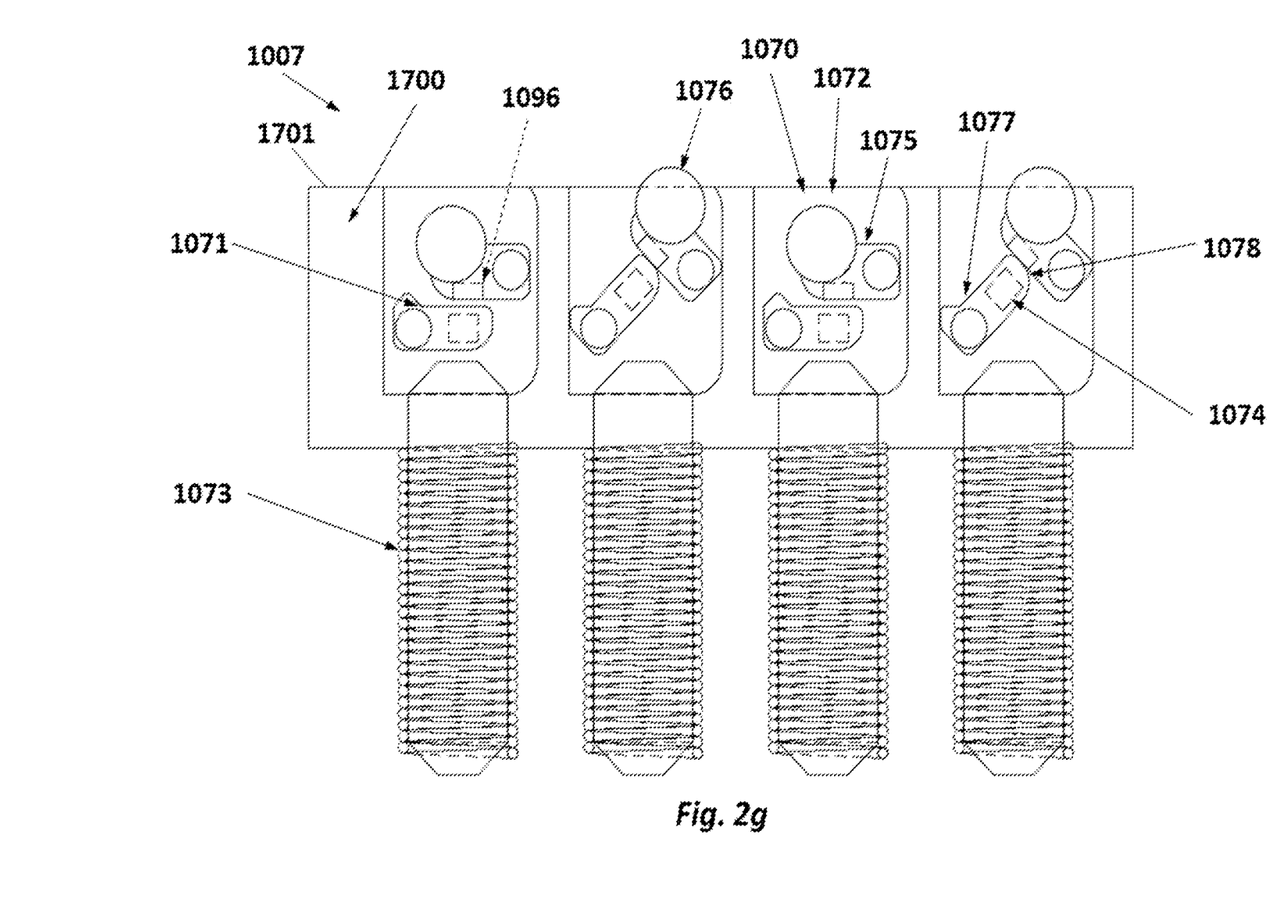
FIG. 2g is a sectional view of another embodiment of a tactile display in accordance with the present disclosure.

An illustrative tactile display 1007 in accordance with another embodiment of the present disclosure is shown in FIG. 2g. The tactile display 1007 includes a housing 1700 and one or more pixel units 1070 coupled to the housing 1700. The housing 1700 defines an outward-facing surface 1701 and the pixel units 1070 are arranged on the housing 1700 inward of the surface 1701. The tactile display 1007 dynamically reproduces content from an electronic device, such as the electronic device 100 of FIG. 1, in a touch-sensory format, such as Braille. The pixel units 1070 are configured to provide dynamic, touch-sensory feedback to a user running their fingertip along the surface 1701. In some embodiments, the tactile display 1007 includes a plurality of pixel units 1070 arranged in rows and columns along the surface 1701. In some embodiments, a plurality of pixel units 1070 are arranged relative to one another in a pattern, such as a Braille cell.

Each exemplary pixel unit 1070 includes a tactile element 1072, a latch 1071, and an actuator 1073 as shown in FIG. 2g. An arm 1075 of the tactile element 1072 is pivotably coupled to the housing 1700 and terminates in an engagement portion 1076. The tactile element 1072 is movable relative to the housing 1700 between an extended position with the engagement portion 1076 extending outward from the surface 1701 and a retracted position with the engagement portion 1076 arranged at or inward from the surface 1701.

The latch 1071 is pivotably coupled to the housing 1700 and defines a base portion 1077 and a cam portion 1078 extending from the base portion 1077 as shown in FIG. 2g. The latch 1071 is movable between an unlocked position and a locked position. The arm 1075 of the tactile element 1072 engages with the base portion 1077 of the latch 1071 with the latch 1071 in the unlocked position and the tactile element 1072 in the retracted position. The arm 1075 of the tactile element 1072 engages with the cam portion 1078 of the latch 1071 with the latch 1071 in the locked position and the tactile element 1072 in the extended position. In some embodiments, the latch 1071 engages with the housing 1700 in the locked position to block rotation of the latch 1071 and hold the tactile element 1072 in the extended position against forces exerted on the engagement portion 1076 of the arm 1075, such as during contact of the engagement portion 1076 by a user. In some embodiments, a detent or other structure engages with the latch 1071 in the locked position to block rotation of the latch 1071.

In the illustrative embodiment, a magnetic element 1074 is coupled to the latch 1071 and the actuator 1073 is configured to generate a magnetic field to induce rotation of the magnetic element 1074 and attached latch 1071, such as by repelling or attracting the magnetic element 1074, as shown in FIG. 2g. The latch 1071 is configured to force the tactile element 1072 to move from the retracted position to the extended position with rotation of the latch 1071 from the unlocked position to the locked position. In some embodiments, the cam portion 1078 of the latch 1071 rides along the arm 1075 of the tactile element 1072 with rotation of the latch 1071 from the unlocked position to the locked position to drive rotation of the tactile element 1072 from the retracted position toward the extended position. In some embodiments, the actuator 1073 is formed from a coil wrapped around a metal core, and the coil is selectively energized by a power source. In some embodiments, the actuator 1073 can generate multiple magnetic fields, such as a positive field and a negative field, for driving rotation of the latch 1071 between the unlocked and locked positions.

In some embodiments, the latch 1071 and/or tactile element 1072 are biased relative to the housing 1700 and the actuator 1073 is configured to overcome the bias when driving rotation of the latch 1071. In some embodiments, the magnetic element 1014 is a magnet or a magnetically-attractive material, such as metal. In some embodiments, a magnetic element 1096 is coupled to the tactile element 1072, and the actuator 1073 is configured to generate a magnetic field to repulse or attract the magnetic element 1096 for movement of the tactile element 1072 between the extended and retracted positions. In some embodiments, the magnetic element 1096 is magnetically biased toward the magnetic element 1074. In some embodiments, the magnetic element 1096 is a magnet or a magnetically-attractive material, such as metal. In some embodiments, a pivot point of the latch 1071 is laterally offset from the actuator 1073, and a pivot point of the tactile element 1072 is laterally offset from the actuator 1073 and from the pivot point of the latch 1071.

In illustrative embodiments, a pixel unit (sometimes called a locking dot) includes a latch (sometimes called a lower flip-dot) movable from a lowered position to a raised position. The lower flip-dot contacts a tactile element (sometimes called an upper flip-dot) in affecting the upper flip-dot to move from a lowered position to a raised position. The rotation of the lower flip-dot is affected by an actuator, positioned substantially under the lower flip-dot, and interacting with a magnet, which is connected to the lower flip-dot. When the lower flip-dot is lowered by means of rotation in a reverse direction, the lower flip-dot contacts the upper flip-dot, affecting it to move from the raised position to the lowered position. This combination of a lower flip-dot with an upper flip-dot creates a lock. When a fingertip senses the dot of the upper flip-dot, the forces from the fingertip will not retract the dot.

In illustrative embodiments, the magnet of the lower flip-dot is attracted to the upper flip-dot. The attraction to the upper flip-dot can be caused by a magnet inside the upper flip-dot, a magnetic conductive material inserted into the upper flip-dot, such as steel, or the entirety of the upper flip-dot if made from a material having magnetic conductance properties.

In illustrative embodiments, the lower flip-dot is mechanically connected via a linkage to the upper flip-dot. The connection is such that the upper flip-dot moves from a lowered position to a raised position as the lower flip-dot rotates. When both the upper and lower flip-dots are in a raised position, the dot is locked in place.

In illustrative embodiments, a flip-dot is locked in place by means of moving an externally actuated lock from a retracted position to a locking position. The lock is moved by means of an external locking actuator. The lock prevents the retraction of the flip-dot because the motion to retract is physically blocked with the lock in the locking position. When the flip-dot needs to be retracted, the lock is retracted by the locking actuator, such that the path of the flip-dot is no longer blocked, and the flip-dot may retract. In some embodiments, the external actuator could connect to all of the locks and operate simultaneously. In some embodiments, one external actuator could be used for one lock for a respective flip-dot such that all of the flip-dots could be locked and unlocked independently from each other.

In illustrative embodiments, a non-contact means of affected actuation could be used to position the lock in such a way as to prevent a raised dot from being lowered. It is also contemplated that the flip-dots could not only be locked in a raised position, but also could be locked in a lowered position.

In illustrative embodiments, compact and economical components can be used for the pixel units. The compactness of the design allows for the creation of a multi-line display, or even a graphics display. The tactile displays and pixel units of the present disclosure have economic benefits compared to other designs. The pixel units may cost substantially less than designs incorporating piezoelectric actuators, for example. This lower cost per cell makes multi-line displays possible at lower market costs. The actuators for the pixel units of the present disclosure can be fixed or can be moving. Moving actuators under the pixel units can actuate more than one tactile element, which can allow for very large displays with many pixel units, including those that can show large graphics. The cost reduction per pixel unit is magnified with mobile actuators because the cost of each pixel unit will not require an individual actuator. This mobile actuator cost reduction allows for the potential of much larger displays at potentially even lower costs. The mobile actuators also reduce the number of parts in the display. Since, for example, there are 8 Braille dots per cell, and typically 40 cells per line of text, this number of components can be very large for multi-line displays. So, the reduction in parts is significant in terms of the life of the machine, and the potential for failure of parts. Examples of various tactile displays and tactile elements and actuators therefor are shown in U.S. Pat. App. Pub. No. 2019/0385483, the entirety of which is expressly incorporated by reference herein.

There are some alternative applications for the tactile displays contemplated by the present disclosure. These include the potential to display topographical maps for the benefit of geologists and surveyors, and potentially the military. Maps in general could also be displayed in a graphical display, for the benefit of both sight impaired as well as sighted people as a way to present information in a new format. For medical purposes, a two dimensional and three dimensional display could allow doctors to visualize results of tests. This could give doctors another method of understanding of a medical condition that may not be possible with a computer monitor. While these represent a few of the potential alternative applications, it is believed that there are far more applications that could evolve from the tactile displays of the present disclosure.

The following numbered clauses include embodiments that are contemplated and non-limiting:

Clause 1: A tactile display comprising: a housing defining an outward-facing surface; and a pixel unit coupled to the housing, the pixel unit comprising: a tactile element arranged for movement between an extended position where a portion of the tactile element extends outward from the outward-facing surface and a retracted position where the tactile element is arranged at or inward of the outward-facing surface; a latch pivotably coupled to the housing; and an actuator coupled to the housing and configured to generate a magnetic field to induce rotation of a magnetic element coupled to the latch for driving rotation of the latch between a locked position corresponding to the extended position of the tactile element and an unlocked position corresponding to the retracted position of the tactile element, wherein the latch is configured to force the tactile element to move from the retracted position to the extended position with rotation of the latch from the unlocked position to the locked position, and wherein the latch blocks movement of the tactile element from the extended position toward the retracted position with the latch in the locked position.

Clause 2: The tactile display of clause 1, wherein an arm of the tactile element is pivotably coupled to the housing and terminates in an engagement portion, and wherein the engagement portion extends outward from the outward-facing surface in the extended position of the tactile element and is arranged at or inward of the outward-facing surface in the retracted position of the tactile element.

Clause 3: The tactile display of clause 2, wherein the latch includes a body portion pivotably coupled to the housing and a cam portion extending from the body portion, and wherein the cam portion is arranged to engage with the arm portion of the tactile element with rotation of the latch from the unlocked position toward the locked position to drive movement of the tactile element from the retracted position toward the extended position.

Clause 4: The tactile display of clause 3, wherein the cam portion of the latch engages with the arm portion of the tactile element in the locked position to block movement of the tactile element from the extended position toward the retracted position.

Clause 5: The tactile display of clause 1, wherein an arm of the tactile element is pivotably coupled to the latch and terminates in an engagement portion, wherein the engagement portion extends outward from the outward-facing surface in the extended position of the tactile element and is arranged at or inward of the outward-facing surface in the retracted position of the tactile element, and wherein the arm of the tactile element engages with the latch during rotation of the latch from the unlocked position to the locked position to drive movement of the tactile element from the retracted position toward the extended position.

Clause 6: The tactile display of clause 1, wherein a link is pivotably coupled to the tactile element and pivotably coupled to the latch, and wherein the link engages with the tactile element and the latch during rotation of the latch from the unlocked position to the locked position to drive movement of the tactile element from the retracted position toward the extended position.

Clause 7: The tactile display of clause 1, further comprising a magnetic element coupled to the tactile element, and wherein the magnetic element coupled to the tactile element is magnetically attracted toward the magnetic element coupled to the latch.

Clause 8: The tactile display of clause 1, wherein the latch engages with the housing and/or the actuator in the locked position to limit rotation of the latch.

Clause 9: A tactile display comprising: a housing defining an outward-facing surface; and a plurality of pixel units coupled to the housing and arranged in at least one row and/or at least one column along the outward-facing surface, each pixel unit comprising: a tactile element pivotably coupled to the housing and arranged for movement between an extended position where a portion of the tactile element extends outward from the outward-facing surface and a retracted position where the tactile element is arranged at or inward of the outward-facing surface; a latch pivotably coupled to the housing; and an actuator coupled to the housing and configured to generate a magnetic field to induce rotation of a magnetic element coupled to the latch for driving rotation of the latch between a locked position corresponding to the extended position of the tactile element and an unlocked position corresponding to the retracted position of the tactile element, wherein the latch is configured to force the tactile element to move from the retracted position to the extended position with rotation of the latch from the unlocked position to the locked position, and wherein the latch blocks movement of the tactile element from the extended position toward the retracted position with the latch in the locked position.

Clause 10: The tactile display of clause 9, wherein an arm of the tactile element is pivotably coupled to the housing and terminates in an engagement portion, and wherein the engagement portion extends outward from the outward-facing surface in the extended position of the tactile element and is arranged at or inward of the outward-facing surface in the retracted position of the tactile element.

Clause 11: The tactile display of clause 10, wherein the latch engages a leg with rotation of the latch to the unlocked position to force the tactile element toward the retracted position Clause 12: The tactile display of clause 10, wherein the latch includes a body portion pivotably coupled to the housing and a cam portion extending from the body portion, and wherein the cam portion is arranged to engage with the arm portion of the tactile element with rotation of the latch from the unlocked position toward the locked position to drive movement of the tactile element from the retracted position toward the extended position.

Clause 13: The tactile display of clause 12, wherein the cam portion of the latch engages with the arm portion of the tactile element in the locked position to block movement of the tactile element from the extended position toward the retracted position.

Clause 14: The tactile display of clause 9, wherein the actuator is aligned with a pivot point of the latch, and wherein a pivot point of the tactile element is laterally offset from the latch and the actuator.

Clause 15 The tactile display of clause 9, wherein a pivot point of the latch is laterally offset from the actuator, and wherein a pivot point of the tactile element is laterally offset from the actuator and from the pivot point of the latch.

Clause 16: The tactile display of clause 9, further comprising a magnetic element coupled to the tactile element, and wherein the magnetic element coupled to the tactile element is magnetically attracted toward the magnetic element coupled to the latch.

Clause 17: The tactile display of clause 9, wherein the latch engages with the housing and/or the actuator in the locked position to limit rotation of the latch.

Clause 18: A pixel unit comprising: a tactile element arranged for movement between an extended position and a retracted position; a latch arranged for rotation relative to the tactile element; and an actuator configured to generate a magnetic field to induce rotation of a magnetic element coupled to the latch for driving rotation of the latch between a locked position corresponding to the extended position of the tactile element and an unlocked position corresponding to the retracted position of the tactile element, wherein the latch is configured to force the tactile element to move from the retracted position to the extended position with rotation of the latch from the unlocked position to the locked position, and wherein the latch blocks movement of the tactile element from the extended position toward the retracted position with the latch in the locked position.

Clause 19: The pixel unit of clause 18, wherein a cam portion of the latch is arranged to engage with an arm portion of the tactile element with rotation of the latch from the unlocked position toward the locked position to drive movement of the tactile element from the retracted position toward the extended position, and wherein the cam portion of the latch engages with the arm portion of the tactile element in the locked position to block movement of the tactile element from the extended position toward the retracted position.

Clause 20: The pixel unit of clause 18, wherein an arm of the tactile element is pivotably coupled to the latch, and wherein the arm of the tactile element engages with the latch during rotation of the latch from the unlocked position to the locked position to drive movement of the tactile element from the retracted position toward the extended position.

Clause 21: The pixel unit of clause 18, wherein a link is pivotably coupled to the tactile element and pivotably coupled to the latch, and wherein the link engages with the tactile element and the latch during rotation of the latch from the unlocked position to the locked position to drive movement of the tactile element from the retracted position toward the extended position.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment, and systems have been described in connection with the specific embodiments, it is not intended that the scope be limited to the particular embodiment sets forth, as the embodiments herein are intended in all respects to be illustrative rather than restrictive.

Unless otherwise expressly stated, it is in no way intended that any method set forth herein be construed as requiring that its step be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a", "an" and "the" include plural referents unless the context clearly dictates otherwise.

Disclosed are components that can be used to perform the disclosed methods, equipment, and systems. These and other components are disclosed herein, and it is understood that when the combinations, subsets, interactions, groups, etc. of these components are disclosed that while specific reference of each various individual and collective combinations and permutations of these may not be explicitly disclosed, each is specifically contemplated and described herein, for all methods, equipment and systems. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

All patents, applications, and publications referred to herein are incorporated by reference in their entirety.

What is claimed is:

1. A tactile display comprising:
   (a) a housing defining an outward-facing surface; and
   (b) a pixel unit coupled to the housing, the pixel unit comprising:
      (i) a tactile element coupled to the housing for pivoting movement relative to the housing about a first pivot axis between an extended position and a retracted position, an arm of the tactile element extending from the first pivot axis and terminating in an engagement portion, the engagement portion arranged to pivot about the first pivot axis relative to the housing on the arm with movement of the tactile element between the extended and retracted positions;
      (ii) a latch pivotably coupled to the housing for pivoting movement relative to the housing about a second pivot axis, the latch including a body portion pivotably coupled to the housing and a cam portion extending from the body portion away from the second pivot axis; and
      (iii) an actuator coupled to the housing and configured to generate a magnetic field to induce rotation of a magnetic element coupled to the latch for driving rotation of the latch about the second pivot axis between a locked position corresponding to the extended position of the tactile element and an unlocked position corresponding to the retracted position of the tactile element,
   wherein the latch is configured to force the tactile element to move from the retracted position to the extended position with rotation of the latch from the unlocked position to the locked position, wherein the latch blocks movement of the tactile element from the extended position toward the retracted position with the latch in the locked position, wherein the engagement portion extends outward from the outward-facing surface in the extended position of the tactile element and is arranged at or inward of the outward-facing surface in the retracted position of the tactile element, and wherein the cam portion of the latch is arranged to engage with the arm portion of the tactile element with rotation of the latch from the unlocked position toward the locked position to drive movement of the tactile element from the retracted position toward the extended position.

2. The tactile display of claim 1, wherein the cam portion of the latch engages with the arm portion of the tactile element in the locked position to block movement of the tactile element from the extended position toward the retracted position.

3. The tactile display of claim 2, wherein the cam portion engages the arm in the locked position at a location offset from a line extending between the first pivot axis and the second pivot axis.

4. The tactile display of claim 3, wherein the latch engages with the housing and/or the actuator in the locked position to limit rotation of the latch.

5. The tactile display of claim 1, further comprising a magnetic element coupled to the tactile element, and wherein the magnetic element coupled to the tactile element is magnetically attracted toward the magnetic element coupled to the latch.

6. The tactile display of claim 1, wherein a leg of the tactile element extends away from the first pivot axis and terminates in a distal end spaced apart from the arm, and wherein the latch is configured to engage the leg with rotation of the latch to the unlocked position to force the tactile element toward the retracted position.

7. The tactile display of claim 1, wherein the actuator is aligned with the second pivot axis of the latch, and wherein the first pivot axis of the tactile element is laterally offset from the latch and the actuator.

8. The tactile display of claim 1, wherein the second pivot axis of the latch is laterally offset from the actuator, and wherein the first pivot axis of the tactile element is laterally offset from the actuator and from the second pivot axis of the latch.

9. A tactile display comprising:
   (a) a housing defining an outward-facing surface; and
   (b) a pixel unit coupled to the housing, the pixel unit comprising:
      (i) a tactile element coupled to the housing for pivoting movement relative to the housing about a first pivot axis between an extended position and a retracted position, an arm of the tactile element extending from the first pivot axis and terminating in an engagement portion, the engagement portion arranged to pivot about the first pivot axis relative to the housing on the arm with movement of the tactile element between the extended and retracted positions;
      (ii) a latch pivotably coupled to the housing for pivoting movement relative to the housing about a second pivot axis; and
      (iii) an actuator coupled to the housing and configured to generate a magnetic field to induce rotation of a magnetic element coupled to the latch for driving rotation of the latch about the second pivot axis between a locked position corresponding to the extended position of the tactile element and an unlocked position corresponding to the retracted position of the tactile element,
   wherein the latch is configured to force the tactile element to move from the retracted position to the extended position with rotation of the latch from the unlocked position to the locked position, wherein the latch blocks movement of the tactile element from the extended position toward the retracted position with the latch in the locked position, wherein the engagement portion extends outward from the outward-facing surface in the extended position of the tactile element and is arranged at or inward of the outward-facing surface in the retracted position of the tactile element, wherein the actuator is aligned with the second pivot axis of the latch, and wherein the first pivot axis of the tactile element is laterally offset from the latch and the actuator.

10. The tactile display of claim 9, wherein a leg of the tactile element extends away from the first pivot axis and terminates in a distal end spaced apart from the arm, and wherein the latch is configured to engage the leg with rotation of the latch to the unlocked position to force the tactile element toward the retracted position.

11. The tactile display of claim 10, wherein the latch includes a body portion pivotably coupled to the housing and a cam portion extending from the body portion away from the second pivot axis, wherein the cam portion is arranged to engage with the arm portion of the tactile element with rotation of the latch from the unlocked position toward the locked position to drive movement of the tactile element from the retracted position toward the extended position, and wherein the cam portion is configured to engage the leg with rotation of the latch to the unlocked position to force the tactile element toward the retracted position.

12. The tactile display of claim 11, wherein the cam portion of the latch engages with the arm portion of the tactile element in the locked position to block movement of the tactile element from the extended position toward the retracted position.

13. The tactile display of claim 12, wherein the cam portion engages the arm in the locked position at a location offset from a line extending between the first pivot axis and the second pivot axis.

14. The tactile display of claim 13, wherein the latch engages with the housing and/or the actuator in the locked position to limit rotation of the latch.

15. The tactile display of claim 9, further comprising a magnetic element coupled to the tactile element, and wherein the magnetic element coupled to the tactile element is magnetically attracted toward the magnetic element coupled to the latch.

16. A pixel unit comprising:
(a) a tactile element arranged for pivoting movement about a first pivot axis between an extended position and a retracted position, an arm of the tactile element extending from the pivot axis and terminating in an engagement portion, the engagement portion arranged to pivot about the first pivot axis on the arm with movement of the tactile element between the extended and retracted positions;
(b) a latch arranged for pivoting movement about a second pivot axis, the latch including a body portion and a cam portion extending from the body portion away from the second pivot axis; and
(c) an actuator configured to generate a magnetic field to induce rotation of a magnetic element coupled to the latch for driving rotation of the latch about the second pivot axis between a locked position corresponding to the extended position of the tactile element and an unlocked position corresponding to the retracted position of the tactile element, wherein the latch is configured to force the tactile element to move from the retracted position to the extended position with rotation of the latch from the unlocked position to the locked position, wherein the latch blocks movement of the tactile element from the extended position toward the retracted position with the latch in the locked position, wherein the cam portion of the latch is arranged to engage with the arm of the tactile element with rotation of the latch from the unlocked position toward the locked position to drive movement of the tactile element from the retracted position toward the extended position, and wherein the cam portion of the latch engages with the arm of the tactile element in the locked position to block movement of the tactile element from the extended position toward the retracted position.

17. The pixel unit of claim 16, wherein the cam portion engages the arm in the locked position at a location offset from a line extending between the first pivot axis and the second pivot axis.

18. The pixel unit of claim 16, wherein a leg of the tactile element extends away from the first pivot axis and terminates in a distal end spaced apart from the arm, and wherein the latch is configured to engage the leg with rotation of the latch to the unlocked position to force the tactile element toward the retracted position.

19. The pixel unit of claim 16, wherein the actuator is aligned with the second pivot axis of the latch, and wherein the first pivot axis of the tactile element is laterally offset from the latch and the actuator.

20. The pixel unit of claim 16, wherein the second pivot axis of the latch is laterally offset from the actuator, and wherein the first pivot axis of the tactile element is laterally offset from the actuator and from the second pivot axis of the latch.

* * * * *